United States Patent Office 3,379,317
Patented Apr. 23, 1968

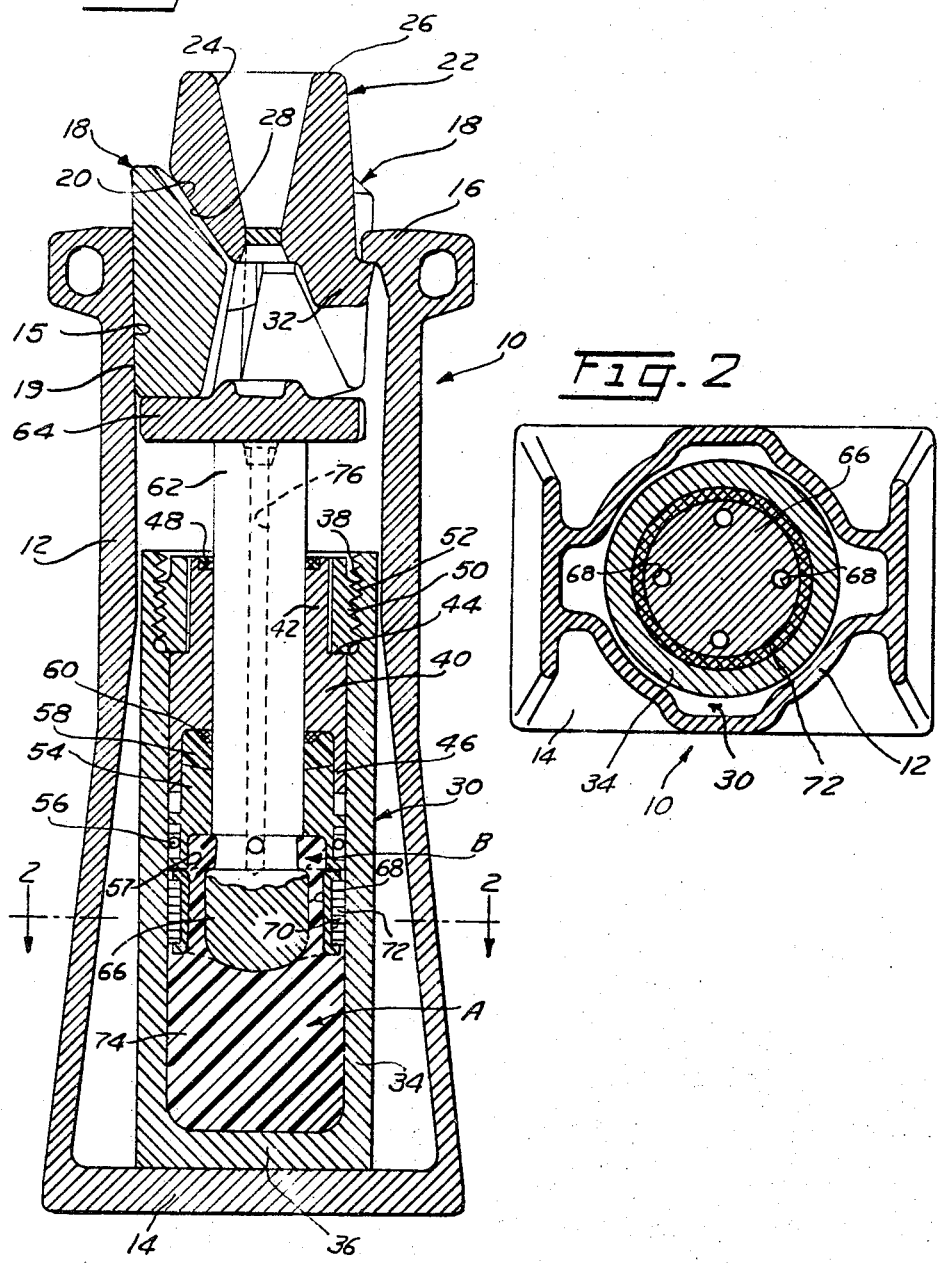

3,379,317
DRAFT GEAR
Robert L. Carlson, Chicago, Ill., assignor to W. H. Miner, Inc., Chicago, Ill., a corporation of Delaware
Filed Feb. 2, 1966, Ser. No. 524,515
2 Claims. (Cl. 213—22)

ABSTRACT OF THE DISCLOSURE

A friction draft gear wherein inward movement of the friction shoes is opposed by movement of a piston and rod assembly inwardly of and through a fixed volume of compressible solid confined in a casing disposed in the gear housing, the outer end of the piston rod being engageable by the friction shoes, and wherein the piston is provided with axial orifices disposed inwardly of the periphery thereof whereby the piston and rod assembly is guidingly supported at axially spaced points in said chamber and a piston rod bearing mounted in the open end of the chamber, respectively, whereby the piston and rod assembly is positively retained in axial alignment in the casing during inward movement as a result of impact forces. A differential pressure seal is provided to prevent extrusion of the compressible seal along the piston rod.

My present invention relates generally to a draft gear and more particularly to a friction draft gear in which is incorporated a novel form of damped spring.

In brief, the draft gear of my present invention comprises an elongated housing having a closed end and an open end, friction shoes at the open end of the housing, and a wedge member engaging the friction shoes and arranged for actuating the same in response to impact forces. Disposed within the draft gear housing, and cooperatively arranged to receive impact forces transmitted through the wedge member and the friction shoes, is a damped spring comprising an elongated casing with a chamber therein, a piston rod, and a piston at the end of the piston rod within the chamber. The piston is formed with axial orifice means therethrough, and the chamber is filled with a compressible solid. As the piston rod moves into the chamber and reduces the volume of the compressible solid, the latter imposes a damping and spring force on the piston rod and piston.

It is an object of my present invention to provide a friction draft gear assembly, as described, wherein the piston is slidably guided at its outer periphery in the casing and the piston rod is slidably guided in a piston rod bearing mounted in the casing, whereby the piston and the piston rod are maintained in positive alignment with the axis of the casing.

It is another object of my present invention to provide a friction draft gear assembly, as described, wherein a differential pressure seal assembly is mounted in the casing about the piston rod to furnish a seal under a pressure that is higher than the pressure of the compressible solid in the chamber whereby to prevent extrusion of the compressible solid along the piston rod.

It is a further object of my present invention to provide a friction draft gear assembly, as described, wherein means are included for varying the initial pressure of the compressible solid in the chamber.

It is a still further object of my present invention to provide a friction draft gear assembly wherein high maximum capacity can be obtained in railway draft riggings and the like.

Now in order to acquaint those skilled in the art with the manner of constructing and using draft gears in accordance with the principles of my present invention, I shall describe in connection with the accompanying drawing, a preferred embodiment of my invention.

In the drawing:

FIGURE 1 is a longitudinal median sectional view of a friction draft gear incorporating the damped spring of my present invention; and FIGURE 2 is a transverse sectional view, taken substantially along the line 2—2 in FIGURE 1, looking in the direction indicated by the arrows.

Referring now to the drawing, there is indicated generally by the reference numeral 10 a friction draft gear incorporating the principles of my present invention. The friction draft gear 10 includes an elongated housing 12, one end of which is closed by an end wall or plate 14. The draft gear 10 is adapted to be received in any standard A.A.R. draft gear pocket on a railroad car, and the end wall 14 functions as one of the followers of the device for engagement with the usual buff lugs associated with the draft gear pocket. The open end of the housing 12 is provided with inner friction surfaces 15 and with a series of three circumferentially spaced inwardly turned flange-like lugs 16 for a purpose to be described hereinafter.

Three wing-like friction shoes 18 are disposed in the open end of the housing 12 in a circumferentially spaced relationship. The shoes 18 are characterized by external friction surfaces 19 that are complementary to the friction surfaces 15 of the housing 12. Also, tapered inner surfaces 20 of the shoes 18 define an outwardly opening six-sided pocket for receiving the inner end of a wedge member 22. The wedge 22 is formed with a central recess 24 and with a flat annular rim 26 at the outer end thereof. The perimeter of the outer end of the wedge 22 is generally circular in cross section and the sides thereof diverge in a direction inwardly of the housing 12. The inner end of the wedge 22 is characterized by six circumferentially arranged friction surfaces 28 which converge sharply in a direction inwardly of the housing 12 and are in continuous complementary engagement with the inner friction surfaces 20 of the shoes 18.

Cooperating with the friction shoes 18 and the wedge 22 is damped spring means, indicated generally by the reference numeral 30, arranged within the housing 12. When buff or draft forces are applied to the draft gear 10, the wedge 22, and correspondingly the friction shoes 18, are moved relatively inwardly of the housing 12. The damped spring means 30 resists the longitudinal inward movement of the friction shoes 18 whereby to cushion, and absorb a portion of, the buff or draft forces. To retain the wedge 22 and the shoes 18 in the open end of the housing 12, despite the outward biasing action of the damped spring means 30, the wedge 22, adjacent the inner end, is provided with a series of circumferentially spaced outwardly projecting flange-like lugs 32 which correspond in number and spacing to the inwardly projecting lugs 16 at the open end of the housing 12. During assembly of the draft gear, the lugs 32 of the wedge 22 are engaged inwardly of the lugs 16 of the housing 12 whereby the wedge 22 and the shoes 18 are positively retained in the open end of the housing 12.

The damped spring means 30, which serves to dissipate a portion of the energy of buff and draft forces applied to the draft gear 10, comprises an elongated casing 34. One end of the casing 34 is closed by an end wall 36, and the other end of the casing 34 is formed with internal threads 38. Preferably, the casing 34 is cylindrical in cross section and has a uniform internal diameter along its unthreaded portion. Mounted within the casing 34, adjacent the open end thereof, is a piston rod bearing or gland 40. The bearing 40 is formed with an annular collar portion 42 of reduced outer diameter, an intermediate annular radial shoulder portion 44, and an annular flange portion 46 of enlarged inner diameter. Mounted in the outer end of the bearing collar portion 42 is an annular piston rod wiper 48, and arranged about the collar portion 42 is an adjustable ring 50. The ring 50 is formed with external threads 52 that engage the casing threads 38, and the inner edge of the ring 50 abuts the shoulder portion 44 of the piston rod bearing 40. Slidably mounted in the bearing flange 46 is the one end of an annular stepped floating sleeve member 54, which carries an O-ring or seal 56 that engages the inner wall of the casing 34, and which is recessed as at 57. Interposed between the bearing 40 and the sleeve member 54 within the confines of the flange portion 46 are a seal 58 formed of a soft pliable material such as Teflon impregnated asbestos, and an anti-extrusion ring 60.

Slidably guided in the piston rod bearing 40 is a piston rod 62 that projects outwardly of the casing 34. The outer end of the piston rod 62 is provided with a cap portion 64 that engages the inner ends of the friction shoes 18. The piston rod 62 extends through the sleeve member 54 and at its inner end is provided with a piston 66. The piston 66 is formed with axial orifice means defined by a plurality of axial orifices 68 therethrough, and with an annular peripheral channel 70. Mounted within the channel 70 is a wear strip 72 which engages the inner periphery of the casing 34 and thereby slidably guides the piston 66 during axial movement thereof. The closed end of the casing 34 and the sleeve member 54 serve to define a chamber comprised of a first section A on one side of the piston 66 and a second section B on the other side of the piston 66. The chamber sections A and B are in communication by reason of the axial orifices 68. To make the damped spring means 30 operational, the chamber sections A and B, as well as the orifices 68, are filled with a compressible solid or elastomer 74 such as silicone rubber. Finally, pasageway means 76 is provided in the piston rod 62 in order that air may be bled from the chamber section B to the atmosphere when necessary. The draft gear 10 is shown inactivated in FIGURE 1.

In the operation of the draft gear 10, impact forces received by the wedge 22 cause the latter and the friction shoes 18 to move inwardly of the housing 12 whereupon a portion of the impact forces is dissipated as a result of the frictional interengagement of the surfaces 20 and 28, and 15 and 19. Additionally, inward movement of the friction shoes 18 causes the piston rod 62 and the piston 66 to move inwardly of the casing 34. During such movement, the piston 66 is forced into the compressible solid 74 in the chamber section A thereby causing the compressible solid to flow through the axial orifices 68 from the chamber section A to the chamber section B. Also, as the piston rod 62 moves inwardly of the casing 34, the pressure within the compressible solid 74 increases in direct proportion to the extent of inward movement of the piston rod. This is due to the fact that the piston rod 62 displaces a portion of the volume of the chamber sections A and B otherwise available for the compressible solid and thus reduces the volume of the latter. As the piston 66 moves through the compressible solid under the conditions outlined, the energy of impact forces received by the piston rod 62 is dissipated. When the impact forces are removed from the wedge 22, and hence from the piston rod 62, the pressure of the compressible solid 74, acting on the unbalanced area of the piston rod 62, causes the piston 66 and piston rod 62 to return to the position shown in the drawing. During the return stroke of the piston rod 62, the compressible solid 74 in the chamber section B is forced back into the chamber section A through the axial orifices 68. As will be appreciated, the compressible solid provides a damping and spring force on the piston rod and piston as the piston rod moves into the chamber and reduces the volume of the solid.

In the foregoing described damped spring means 30 of my present invention, the floating sleeve member 54, the seal 58 and the anti-extrusion ring 60 serve as a differential pressure seal assembly. The arrangement of this seal assembly is such that the seal 58 is maintained under a higher pressure than the pressure of the compressible solid 74 in the chamber sections A and B. Thus, a positive dam is provided for preventing extrusion of the compressible solid along the piston rod 62. In this connection, the wiper 48 serves to keep the piston rod 62 clean and prevents any foreign matter from entering the described seal assembly. By reason of the adjustable ring 50, which engages the piston rod bearing 40, the compressible solid 74 may be preloaded as desired. That is, the ring 50 may be rotated axially inwardly or outwardly for altering the axial position of the piston rod bearing 40, the pliable seal 58 and the sleeve member 54 relative to the casing 34 whereby to vary the initial pressure of the compressible solid. Finally, it is to be especially noted that the piston rod 62 is guided in the bearing 40 and that the piston 66 is guided in the casing 34 by the wear strip 72. These two axially spaced positive areas of support serve to maintain the piston rod 62 and the piston 66 in positive alignment with the axis of the casing 34, even though angular or canting impact forces are transmitted from the friction shoes 18 to the piston rod portion 64.

Now while I have shown and described what I believe to be a preferred embodiment of my present invention, it will be understood by those skilled in the art that various rearrangements and modifications may be made therein without departing from the spirit and scope of my invention.

I claim:

1. For use in a friction draft gear of the type comprising an elongated housing having a closed end and an open end, friction shoes at the open end of the housing, and a wedge member engaging the friction shoes and arranged for actuating the same in response to impact forces, the combination of an elongated casing in the housing having an open end opening toward the open end of said housing, a piston rod bearing mounted in the open end of said casing and defining a chamber therein, a piston rod slidably extending outwardly of said casing through said piston rod bearing and engaging the friction shoes for receiving impact forces transmitted through the wedge member and the friction shoes, a piston at the end of said piston rod within said chamber and having its periphery in sliding engagement with the inner surface of said chamber, said piston and rod assembly thus being guidingly supported at axially spaced points in said rod bearing and said chamber whereby same are positively retained in axial alignment in said casing during inward movement thereof in response to impact forces applied to said wedge member, axial orifice means provided in said piston inwardly of the periphery thereof, a compressible solid filling said chamber whereby the energy of impact forces received by said piston rod is dissipated by said compressible solid as said piston rod moves into said chamber and reduces the volume of said solid and as same is metered through said axial piston orifices, and a differential pressure seal assembly in said casing and arranged about said piston rod to provide a seal under a pressure that is higher than the pressure of said compressible solid in said chamber whereby to prevent extrusion of said compressible solid along said piston rod.

2. The combination of claim 1 wherein said differential pressure seal comprises a sleeve member disposed about said piston rod between said piston and said piston rod bearing in slidable sealing engagement with the inner surface of said chamber, said sleeve member having an annular face at its inner end engageable by the compressible solid metered through said axial piston orifices, and a pliable annular seal disposed about said piston rod and interposed between said piston rod bearing and said sleeve member with said pliable seal being maintained under a higher pressure than the pressure of said compressible solid in said chamber whereby to provide a differential pressure seal assembly preventing extrusion of said compressible solid along said piston rod.

References Cited
UNITED STATES PATENTS

| | | | |
|---|---|---|---|
| 2,554,606 | 5/1951 | Withall | 213—32 X |
| 2,667,277 | 1/1954 | Mulcahy | 213—32 |
| 2,856,035 | 10/1958 | Rohacs. | |
| 3,078,967 | 2/1963 | Brown et al. | |
| 3,178,037 | 4/1965 | Kendall | 213—40 |

DRAYTON E. HOFFMAN, Examiner.

ARTHUR L. LA POINT, Primary Examiner.